United States Patent
Goel et al.

(10) Patent No.: US 11,755,609 B2
(45) Date of Patent: Sep. 12, 2023

(54) AUTOMATICALLY DETECTING DATA OFFLOADING METHODS USING DATA BUCKETING AND MACHINE LEARNING TECHNIQUES

(71) Applicant: Dell Products L.P., Round Rock, TX (US)

(72) Inventors: Akanksha Goel, Faridabad (IN); Selvaraj Subbaian, Coimbatore (IN); Debashish Sahu, Sundargarh (IN); Rajeshkanna Murugesan, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 94 days.

(21) Appl. No.: 17/235,285

(22) Filed: Apr. 20, 2021

(65) Prior Publication Data
US 2022/0335053 A1 Oct. 20, 2022

(51) Int. Cl.
  *G06F 16/25* (2019.01)
  *G06N 20/00* (2019.01)
  *G06F 16/28* (2019.01)

(52) U.S. Cl.
  CPC .......... *G06F 16/254* (2019.01); *G06F 16/289* (2019.01); *G06N 20/00* (2019.01)

(58) Field of Classification Search
  CPC ...... G06F 16/254; G06F 16/289; G06N 20/00
  USPC ....................................................... 707/602
  See application file for complete search history.

(56) References Cited

U.S. PATENT DOCUMENTS

| | | | | |
|---|---|---|---|---|
| 7,861,304 B1 * | 12/2010 | Nachenberg | .......... | G06F 21/564 |
| | | | | 713/188 |
| 10,275,176 B1 * | 4/2019 | Gold | .................. | G06T 1/20 |
| 10,671,434 B1 * | 6/2020 | Gold | ................ | G06F 3/0646 |
| 11,159,335 B2 * | 10/2021 | Shukla | ................ | G06F 1/3209 |
| 11,317,322 B2 * | 4/2022 | Zheng | .................. | H04W 28/08 |
| 2008/0114710 A1 * | 5/2008 | Pucher | .................. | G06N 20/00 |
| | | | | 706/20 |

* cited by examiner

*Primary Examiner* — Hosain T Alam
*Assistant Examiner* — Saba Ahmed
(74) *Attorney, Agent, or Firm* — Ryan, Mason & Lewis, LLP (57) ABSTRACT

Methods, apparatus, and processor-readable storage media for automatically detecting data offloading methods using data bucketing and machine learning techniques are provided herein. An example computer-implemented method includes obtaining operations data and configuration data for one or more storage objects in a database; determining one or more times at which data offloading is to be carried out for at least one of the storage objects in the database, wherein determining the one or more times includes processing at least a portion of the operations data using one or more machine learning techniques; generating at least one data offloading protocol, comprising one or more data offloading methods, by processing at least a portion of the configuration data; and automatically executing, in accordance with the one or more determined times, the at least one generated data offloading protocol for at least a portion of the one or more storage objects in the database.

20 Claims, 8 Drawing Sheets

| OBJECT_NAME | TIMESTAMP | NO_OF_DML_OPERATIONS |
|---|---|---|
| DEVICE_EVENT_DETAIL | 2020-06-01 00 | 357779 |
| DEVICE_EVENT_DETAIL | 2020-06-01 01 | 12340 |
| DEVICE_EVENT_DETAIL | 2020-06-01 02 | 159983 |
| DEVICE_EVENT_DETAIL | 2020-06-01 03 | 412514 |

```
from statsmodels.tsa.arima_model import ARIMA
ARMA1model_hourly_operation = ARIMA(hourly_operation_series, order=(1,2,1)).fit(transparams=False)
ARMA1predict_24hourly_operations = ARMA1model_hourly_operation.predict('2020-09-01 00:00:00 AM','2020-09-02 00:00:00 AM',
                                                                       typ='levels')
print('Forecast/predictions for 24 hours ahead', ARMA1predict_12hourly_operations)
```

FIG. 5

| PRIMARY KEY | LAST MODIFIED DATE |
|---:|---:|
| 1 | 1/1/2020 |
| 2 | 1/1/2020 |
| 3 | 1/1/2020 |
| 4 | 1/1/2020 |
| 5 | 1/1/2020 |
| 6 | 1/1/2020 |
| 7 | 1/1/2020 |
| 8 | 1/1/2020 |
| 9 | 1/1/2020 |
| 10 | 1/1/2020 |
| . | 1/1/2020 |
| 10232 | 1/1/2020 |
| . | 1/2/2020 |
| 20234 | 1/2/2020 |

AUTOMATICALLY DETECTING DATA OFFLOADING METHODS USING DATA BUCKETING AND MACHINE LEARNING TECHNIQUES

FIELD

The field relates generally to information processing systems, and more particularly to data management in such systems.

BACKGROUND

Database applications are important for many enterprise operations. Also, the volume of data within many databases is growing rapidly, and enterprises often must retain data for longer periods of time to comply with various regulations, further increasing data volumes and management costs. Accordingly, a potentially significant portion of such data volume growth is due to an accumulation of inactive data.

Increasing data volumes creates problems such as, for example, causing delays for information technology (IT) organizations associated with provisioning production environments, which typically involves creating copies of production data (e.g., for reporting and/or disaster recovery purposes). Provisioning such copies of data compounds the data growth problem, consuming potentially valuable database and storage capacity.

Conventional database management approaches commonly include acquiring additional storage and/or processing hardware, manual tuning of databases and related applications, and implementing manually-developed scripts to purge data, archive data, and/or create subset copies of data. However, such conventional approaches are typically resource-intensive, time-intensive, and error-prone, and can result in additional problems such as increased architectural complexity.

SUMMARY

Illustrative embodiments of the disclosure provide techniques for automatically detecting data offloading methods using data bucketing and machine learning techniques. An exemplary computer-implemented method includes obtaining operations data and configuration data for one or more storage objects in at least one database, and determining one or more times at which data offloading is to be carried out for at least one of the one or more storage objects in the at least one database, wherein determining the one or more times includes processing at least a portion of the obtained operations data using one or more machine learning techniques. The method also includes generating at least one data offloading protocol, comprising one or more data offloading methods, by processing at least a portion of the configuration data for the one or more storage objects in the at least one database, and automatically executing, in accordance with the one or more determined times, the at least one generated data offloading protocol for at least a portion of the one or more storage objects in the at least one database.

Illustrative embodiments can provide significant advantages relative to conventional database management approaches. For example, problems associated with resource-intensive, time-intensive, and error-prone techniques are overcome in one or more embodiments through automatically detecting data offloading methods using data bucketing and machine learning techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
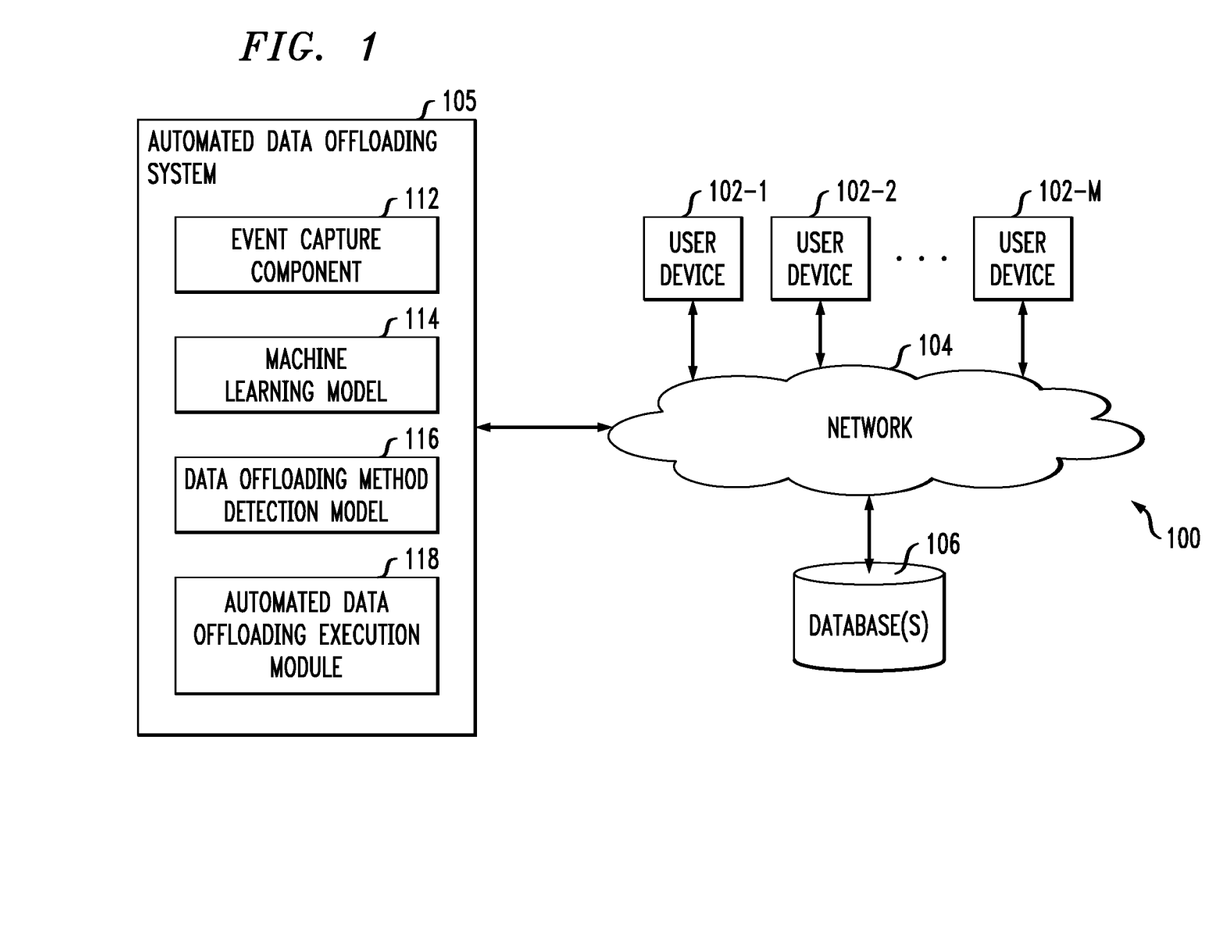
FIG. 1 shows an information processing system configured for automatically detecting data offloading methods using data bucketing and machine learning techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated data offloading system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated data offloading system 105 can have at least one associated database 106 configured to store data pertaining to one or more storage objects therein, which comprise, for example, operations data from each storage object (e.g., merge operation data, insert operation data, update operation data, delete operation data, etc.).

The database 106 in the present embodiment is implemented using one or more storage systems associated with automated data offloading system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated data offloading system 105 are one or more input-output devices, which illustratively comprise keyboards, displays or other types of input-output devices in any combination. Such input-output devices can be used, for example, to support one or more user interfaces to automated data offloading system 105, as well as to support communication between automated data offloading system 105 and other related systems and devices not explicitly shown.

Additionally, automated data offloading system 105 in the FIG. 1 embodiment is assumed to be implemented using at least one processing device. Each such processing device generally comprises at least one processor and an associated memory, and implements one or more functional modules for controlling certain features of automated data offloading system 105.

More particularly, automated data offloading system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated data offloading system 105 to communicate over the network 104 with the user devices 102, and illustratively comprises one or more conventional transceivers.

The automated data offloading system 105 further comprises an event capture component 112, a machine learning model 114, a data offloading method detection model 116, and an automated data offloading execution module 118.

It is to be appreciated that this particular arrangement of elements 112, 114, 116 and 118 illustrated in the automated data offloading system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for automatically detecting data offloading methods using data bucketing and machine learning techniques involving user devices 102 of computer network 100 is presented by way of illustrative example only, and in other embodiments additional or alternative elements may be used. Offloading of data, as used in accordance herein with one or more embodiments, can be carried out from a storage system or a storage object thereof, and can be performed using archiving techniques and/or purging techniques, wherein data removed, for example, from at least one source table. Thus, another embodiment includes additional or alternative systems, devices and other network entities, as well as different arrangements of modules and other components. For example, in at least one embodiment, automated data offloading system 105 and database(s) 106 can be on and/or part of the same processing platform.

An exemplary process utilizing elements 112, 114, 116 and 118 of an example automated data offloading system 105 in computer network 100 will be described in more detail with reference to the flow diagram of FIG. 9.

Accordingly, at least one embodiment includes automatically detecting data offloading methods using data bucketing and machine learning techniques. Such an embodiment includes implementing a configurable method to automatically detect data offload utility for one or more databases, thus reducing resource usage and improving performance of offload activity. In such an embodiment, at least one machine learning algorithm is utilized to identify at least one temporal window to run one or more data offloading jobs on one or more objects (e.g., storage objects having a low number (e.g., below a given threshold amount) of data manipulation language (DML) operations. In such a process, downtime is not required, and resource contention is limited.

Figure 2:
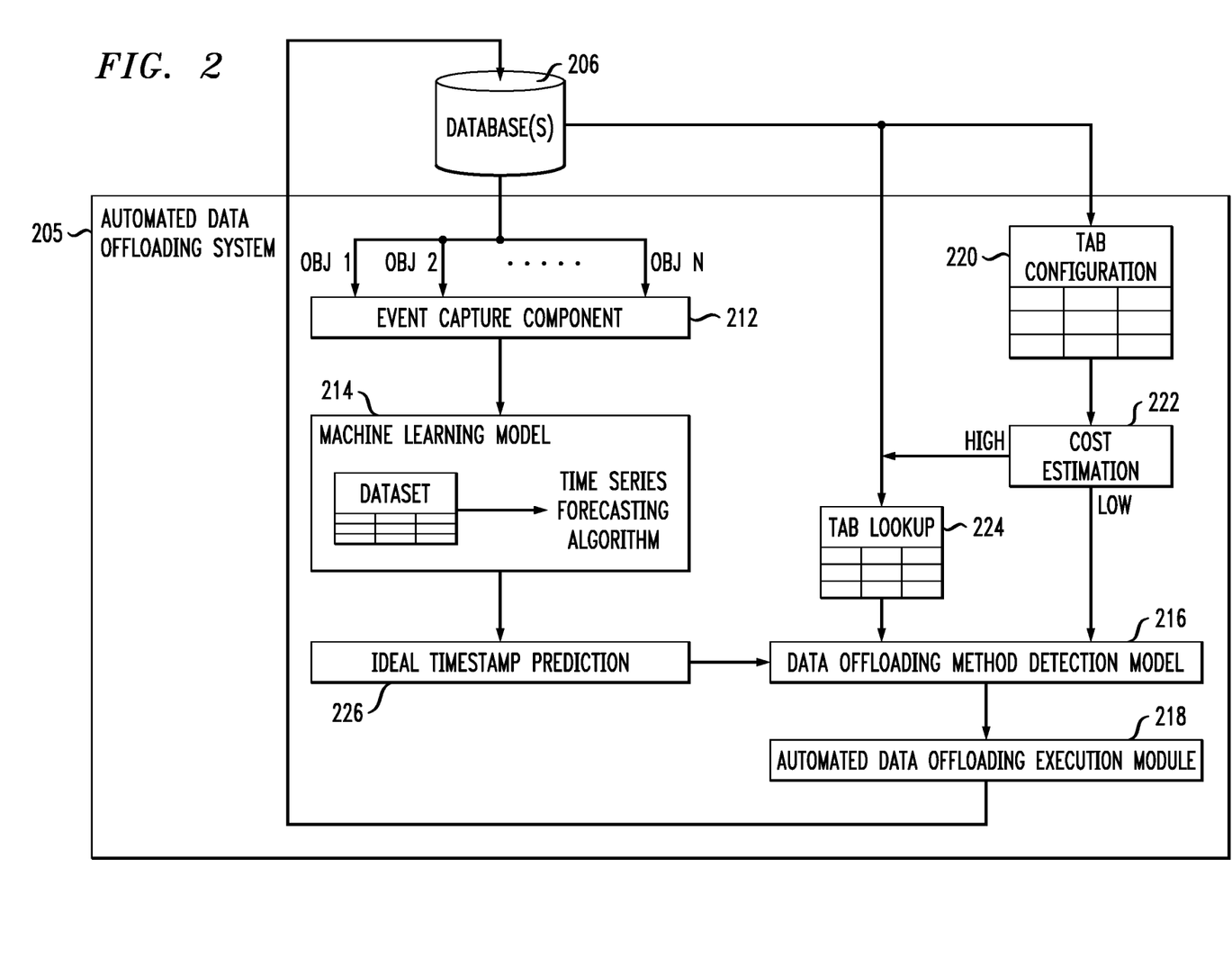
FIG. 2 shows an example workflow for end-to-end automation for database offload routines in an illustrative embodiment.
Figure 3:
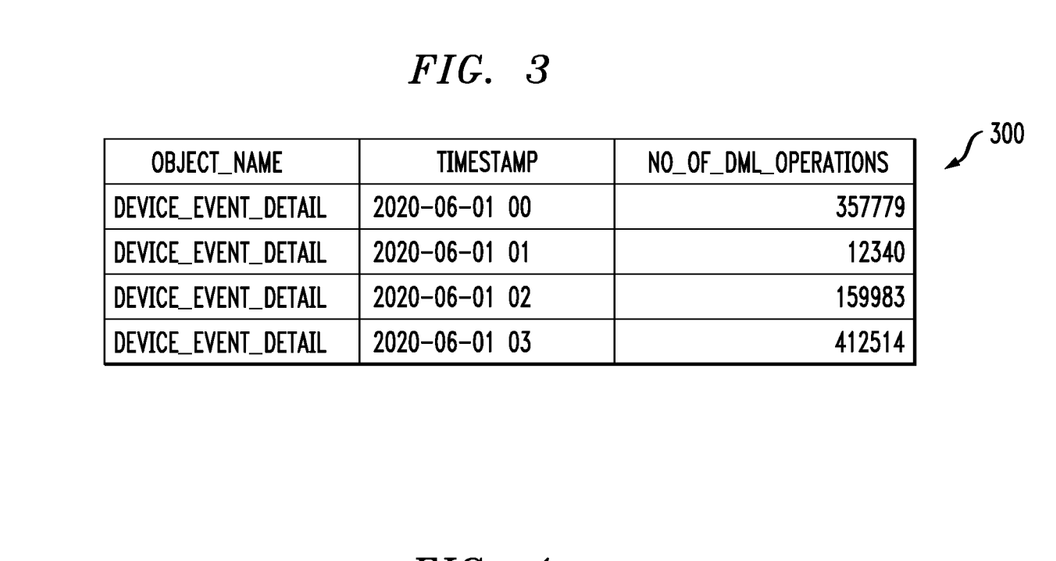
FIG. 3 shows an example training dataset used for time series modelling in an illustrative embodiment.

FIG. 2 shows an example workflow for end-to-end automation for database offload routines in an illustrative embodiment. By way of illustration, FIG. 2 depicts data pertaining to various database operations (e.g., merge operations, insert operations, update operations, delete operations, etc.) being provided to database(s) 206. FIG. 2 also depicts automated data offloading system 205, which includes event capture component 212, machine learning model 214, and data offloading method detection model 216. Specifically, event capture component 212 processes data from various storage objects of database(s) 206, including data such as timestamp information, number of DML operations, schema name information, table name information, etc. Event capture component 212 then transmits at least a portion of such processed data to machine learning model 214, which generates and/or updates a dataset (e.g., dataset 300 as depicted in FIG. 3) based at least in part on the provided data, and processes at least a portion of the dataset using a time series forecasting algorithm (e.g., the time series forecasting algorithm (for example, an ARIMA model, a Prophet algorithm, one or more auto-regressive (AR) algorithms, etc.) is trained using the dataset). The output of the machine learning model is at least one ideal timestamp prediction 226 for carrying out one or more data offloading operations, and the ideal timestamp prediction(s) 226 is then provided to data offloading method detection model 216.

As also illustrated in FIG. 2, database 206 outputs a tab configuration table 220, which is used in at least one cost estimation step 222, and a tab lookup table 224, which is provided to data offloading method detection model 216 (and, optionally, the event capture component 212). In one or more embodiments, tab configuration table 220 can include a set of one or more master tables used for at least one given data offloading procedure. Additionally, in such an embodiment, tab lookup table 224 can include metadata for at least one transactional table data distribution. As illustrated in FIG. 2, based at least in part on the tab configuration table 220, cost estimation step 222 can be carried out to determine an ideal optimization method. For example, if a table is partitioned, the offloading criteria can truncate the table with the partition. If a partition is not there, the table can be processed via index-based data offloading. However, in such an example, if the table does not have an index or a partition, bucket-based data offloading can be carried out. Further, while the data is being offloaded, one or more example embodiments (in connection with cost estimate step 222, for example) can determine whether a full table scan will be performed and/or needed. If yes, then the estimated cost will likely be high (i.e., higher than if a full table scan was not required). As also detailed herein in connection with one or more embodiments, if the cost of running a procedure is deemed to be too high, such an embodiment includes appending additional precision with the help of a lookup-based bucketing model (e.g., using tab lookup table 224).

Additionally, using the ideal timestamp prediction(s) 226, at least a portion of the information contained within the tab lookup table 224, and a determination from cost estimation step 222, data offloading method detection model 216 determines and/or identifies at least one data offloading methods and outputs the same (along with information, for example, pertaining to particular threads) to automated data offloading execution module 218, which can carry out at least one of the data offloading methods on database(s) 206. By way merely of example, in a use case involving a significantly-sized database with a correspondingly large number of tables, one or more embodiments can include configuring a subset of the tables into each of multiple threads so that the processing of data can be parallelized on multiple threads.

Accordingly, and as depicted in FIG. 2 and further detailed herein, one or more embodiments includes implementation of multiple stages. A first stage includes predicting optimal temporal windows and/or instances for performing one or more data offloading operations using at least one ARIMA model. Such an embodiment includes analyzing current behavioral patterns of DML operations for different storage objects in one or more database to determine one or more times at which the DML operations are at a minimum level. At such times, there is less impact on already-running production jobs by data offloading activity, thereby upgrading performance of the database system.

A second stage includes determining at least one optimal data offloading method using an auto-detection model. This stage utilizes at least one user-defined configuration table and bucketing model to identify the most optimal method for offloading data such that resource consumption is limited (e.g., at a minimum level) for the data offloading activity.

Referring again to the temporal prediction stage, at least one ARIMA model is used to predict the number of DML operations occurring for given temporal intervals (e.g., each hourly timestamp). The machine learning model utilizes historical data available for one or more storage objects in the database in question, and processes the behavioral pattern of DML operations occurring on the storage objects to determine at least one time at which the DML operations are at a minimum level.

In one or more embodiments, relevant real-time datasets for DML operations are fetched using event capture methodology for multifarious objects. Such an embodiment can include acquiring and/or capturing data instances for features including, for example, temporally-defined timestamps (e.g., hourly timestamps for one or more days of data), the number of DML operations (e.g., the number of DML operations at each hour of the day), and object name(s) (e.g., table name of a given storage object).

FIG. 3 shows an example training dataset 300 used for time series modelling in an illustrative embodiment. By way of illustration, such a dataset 300 can be used by machine learning model (e.g., model 114 and/or model 214), and can include data pertaining to, for instance, object name, timestamp information, and number of DML operations.

As detailed herein, an ARIMA model represents a class of statistical models for analyzing and forecasting time series data. Additionally, time series forecasting can include multiple stages. One such stage includes visualizing the time series. In at least one embodiment, an ARIMA model can process data at different granularities (e.g., from minutes to an hourly roll-up). By way merely of illustration, such an embodiment can include implementing a time series model which is configured for use with homogenous distributed databases having batch-oriented workloads, which utilizes hourly rolled-up DML operations.

Additionally, one or more embodiments include stationarizing time series data. Most time series models work on the assumption that the time series is stationary. Intuitively, such an assumption indicates that if a time series has a certain behavior over time, a high probability exists that the same pattern will be followed in the future. In at least one embodiment, a rolling mean and standard deviation of a given window (e.g., a window of six) can be used to check the stationarity of one or more data instances. Additionally, such an embodiment can include using at least one method of first order differencing and second order differencing to make the dataset(s) stationary. Therefore, in an example embodiment, an order of differencing (d) can be considered two for an ARIMA (p,q,d) model.

Accordingly, a stationary time series can include the mean and variance being constant over time, and as such, predictions can be easier to generate when the series is stationary. Also, in connection with the above-noted example embodiment, the first differencing value can include the difference between the current time period and the previous time period. If this value fails to revolve around a constant mean and variance, then the second differencing value is determined using the value(s) of the first differencing determination. In one or more embodiments, such a process can be repeated until a stationary series is obtained. Additionally, in such an embodiment, the second order of differencing can include a mean and variance that are almost constant, and therefore, the order of differencing (d) can be considered as two for the ARIMA (p,q,d) model.

Also, in one or more embodiments, autocorrelation plots (ACF) and partial autocorrelation (PACF) plots are used to determine one or more parameters to implement the most suitable ARIMA (p,d,q) model, wherein "p" represents the number of autoregressive terms, "d" represents the number of non-seasonal differences needed for stationarity, and "q" represents the number of lagged forecast errors in the prediction equation. In an example embodiment, ACF and PACF plots include a high (e.g., 95%) confidence interval band, and as such, anything outside of this area can be considered a statistically significant correlation. For instance, if a significant spike is observed at lag (x) in an ACF plot, that information can facilitate a determination of a moving average (MA) of term (q), and if a significant spike is observed in a PACF plot, that information can facilitate a determination of AR of term (p). Therefore, in accordance with such an example embodiment, MA(1) and AR(1) is considered by seeing significant spikes at position (1) in ACF and PACF plots, respectively.

One or more embodiments also include training the ARIMA model. By way merely of example and illustration, such an embodiment can include using an ARIMA category of the statsmodels.tsa.arima_model library for time series forecasting. Such an embodiment can further include defining the p,d,q parameters based on the inputs of previous stages.

Figure 4:
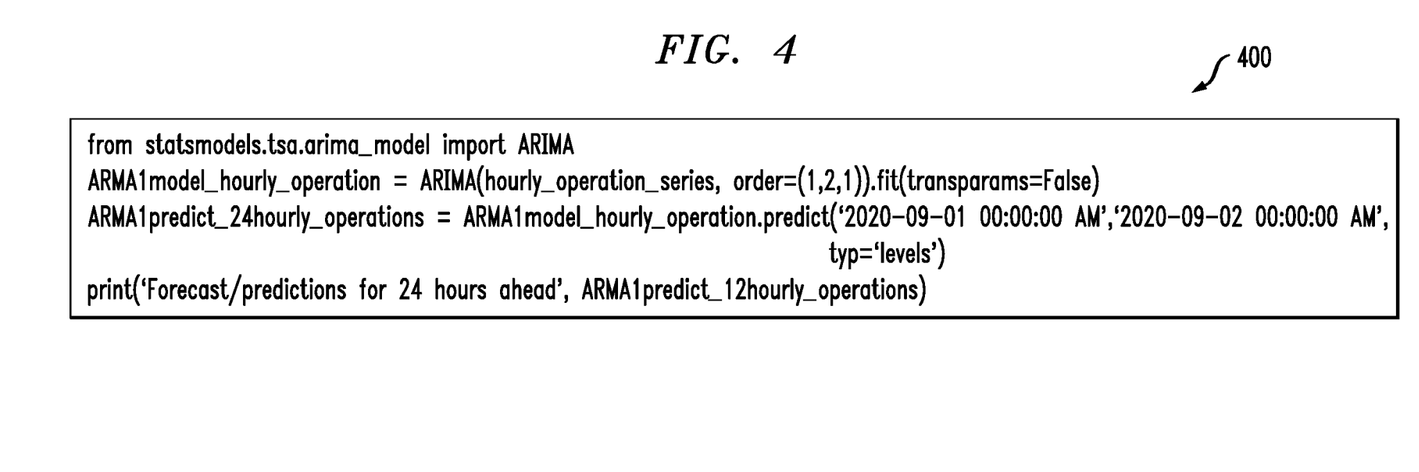
FIG. 4 shows an example code snippet for implementing at least a portion of an autoregressive integrated moving average (ARIMA) model in an illustrative embodiment.

FIG. 4 shows an example code snippet for implementing at least a portion of an ARIMA model in an illustrative embodiment. In this embodiment, example code snippet 400 is executed by or under the control of at least one processing system and/or device. For example, the example code snippet 400 may be viewed as comprising a portion of a software implementation of at least part of automated data offloading system 105 of the FIG. 1 embodiment.

The example code snippet 400 illustrates using an ARIMA category of the statsmodels.tsa.arima_model library to resolve a time series modelling task. In example code snippet 400, the (p,d,q) parameters are defined as (1,2,1), and such parameters helps to envision how the algorithmic rule performs. Additionally, as also illustrated in example code snippet 400, a predict method is used to predict the number of hourly DML operations for next 24 hours.

Additionally, it can be observed from code snippet 400 that the actual number of DML operations at each hourly timestamp for a testing dataset are almost overlapped by predicted number of DML operations. It can also be observed from code snippet 400 that a sudden upsurge in the DML operations is also handled by the ARIMA model.

It is to be appreciated that this particular example code snippet shows just one example implementation of at least a portion of an ARIMA model, and alternative implementations of the process can be used in other embodiments.

As also detailed herein, in one or more embodiments, the ARIMA model utilizes minima (including local minima and global minima) and/or convex points to determine and/or identify the ideal timestamp for data offload activity. In an example embodiment, an optimal time for running data offloading scripts can be interpreted using the concept that the optimal time would be when DML activity is low (e.g., below a given threshold amount) for a given storage object. Therefore, such an embodiment avoids and/or precludes resource contention which is created when a large number of transactions are occurring on a database at peak load. As such, the minima and/or convex points can be identified using the predicted number of DML operations for a given future duration (e.g., the next 24 hour period).

As noted above, another stage of one or more embodiments includes automatically determining an ideal and/or appropriate data offloading method to be implemented at the predicted time(s). In an example embodiment, at least one configuration table is maintained by the user(s) in a multi-model database management system which includes information about different storage objects present therein. Such a configuration table can be built, for example, based on enterprise input during an application launch, and can include specific information such as metadata setup information (e.g., eligible groups for data offloading, including information such as group identifiers (IDs), task descriptions, status information, enablement/disablement of groups for purging, and task type information). Additional specific information can include, for example, database configuration setup information (e.g., information such as storage object name, purging option information, hierarchy purging order information, the number of rows to be purged in one offloading instance, purging criteria, active status information, distinct column selection information, task type definition(s), offloading task information, the number of threads that need to be launched simultaneously, identification information for different types of offloading tasks which can be performed on the data, and description of what needs to be done for a given task). Further, such specific information can additionally include, for example, master-detail relationship configuration setup information (e.g., information such as storage object name (also referred to herein as a primary key) and reference object name (also referred to herein as a foreign key)), and driving table information for offloading setup (e.g., information such as definitions of purging status at the record level (i.e., ACTIVE/DELETED)).

In one or more embodiments, such information and tables help the model identify the most appropriate method for data offloading. In such an embodiment, the model utilizes constraints and at least one configuration table (such as described above) to provide various offloading criteria. Such criteria can include, for example, master-detail relationship with a referential nature. By way of illustration, such criteria can assume that there is a direct relationship between tables A and B, wherein table A is the master table and table B is the detail table. Purging the data from table A involves offloading the related data from detail table B, and then offloading the data from table A.

Such example criteria can also include a master-detail relationship with a transitive nature. Accordingly, when there is indirect relationship, it can be referred to as a transitive relationship, wherein if table A is related to table B, and table B is related to table C, then table A is transitively related to table C. In such a context, purging data from table A involves offloading the related data from detail table C, then offloading the data from the detail table B, and then from table A.

Also, such example criteria can include a single and extended driving table, which involves purging the data from a standalone table which does not have dependency on other tables. Further, such example criteria can include dynamic partition truncate and extended delete, wherein when a partition is defined on a table and data can be offloaded based on the partition, then purging data from the table can be achieved by purging the partition(s) on the table.

Additionally or alternatively, such example criteria can include a standalone table purge and/or truncate, which involves purging data from a standalone table with partitions, wherein such data can be purged based on the partitions which do not have dependency on other tables. Also, such example criteria can further include a swap delete. By way of illustration, when purging data from a table involves more than a given amount (e.g., 70%) of the data, then instead of offloading the data from the table, the required data to be offloaded that is less than a given amount (e.g., 30%) can be swapped to at least one new table. Subsequently, the old table can be swapped to at least one new table.

In such a way, a data offloading method determination is derived using the corresponding configuration table. Post that, in one or more embodiments, the cost of the determined data offloading method (e.g., using an explanation plan provided by the database) is estimated. If the cost of running the procedure exceeds a given amount (e.g., if there is no index or no partition as part of the table in question), then the model appends more precision with the help of at least one lookup-based bucketing model.

In at least one embodiment, a lookup table is dynamically built for different storage objects using event capture methodology. The lookup table captures a set of constraint-based keys which can be used in connection with at least one data offloading process. In such an embodiment, data can be offloaded, for example, with the help of the set of constraint-based keys associated with the driving column mentioned in the corresponding configuration table. In one or more embodiments, a driving column is defined in the configuration table which will be used for offloading the data from the table in question. This facilitates proper utilization of resources and reduction of costs associated with the data offloading process, thereby increasing the performance of the database system.

By way merely of illustration, consider the following example embodiment which includes implementing intelligent bucketing logic to build a lookup table. In this example, assume that purging is required to be carried out on a specific storage object according to a retention policy specified in a given configuration table, namely, LAST_MODIFIED_DATE<SYSDATE-365. Moreover, in this example, the attribute LAST_MODIFIED_DATE is not partitioned and not indexed. Using, for example, a direct approach (as detailed above, an approach derived for offloading) may lead to a full table scan, utilizing significant resources. As such, at least one embodiment includes generating and/or utilizing one or more constraint keys associated with the LAST_MODIFIED_DATE attribute, which would reduce the amount of resources used while offloading.

Additionally, maintaining all of the constraint-based keys associated with the LAST_MODIFIED_DATE attribute (driving column) in a separate table would likely be a disadvantageous endeavor. Therefore, at least one embodiment includes implementing a bucketing concept which enables maintaining minimum and maximum values for continuous sets of constraint-based keys associated for the LAST_MODIFIED_DATE attribute. As detailed herein, an example embodiment including a table that lacks a partition and also lacks an index can lead to resource contention when data offloading occurs. Therefore, such an embodiment can include using one or more primary keys for bucketing logic as follows. By way of example, such an embodiment can include obtaining the driving column from the configuration table and the associated primary key(s) for that driving column. Minimum and maximum values for continuous sets of the primary key(s) for the values in the driving column are identified for lookup table maintenance, and the lookup table will be upserted as and when there is change in the main table with respect to the driving column.

Without the bucketing approach, scanning all of the records (e.g., primary keys) for the driving column (last_modified_date) would be required.

Figure 5:
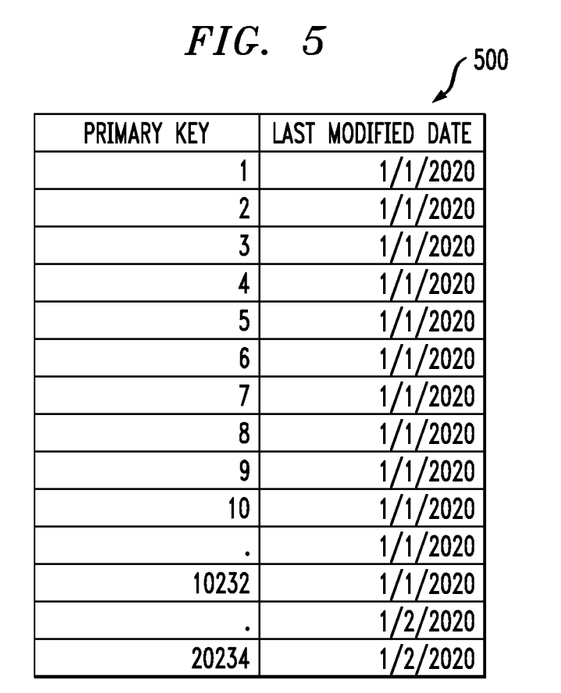
FIG. 5 shows a table containing primary key information based on last modified date information in an illustrative embodiment.

In the above example, assume that a "constraint key" for a storage object is used synonymously with a "primary key." By way of illustration, example table 500 in FIG. 5 illustrates information obtained through event capture methodology which entails the primary keys updated for last modified dates.

Figure 6:
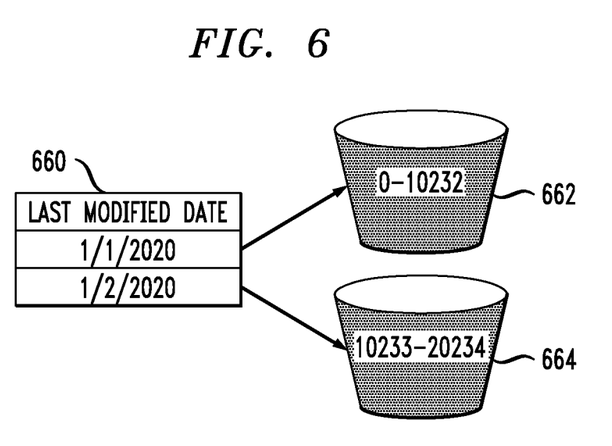
FIG. 6 shows bucketing of continuous sets of primary keys on the basis of a driving column in an illustrative embodiment.

As also detailed herein, using bucketing intelligence enables one or more embodiments to maintain the least amount of available information for the model lookup, as depicted in FIG. 6. Specifically, FIG. 6 shows bucketing of continuous sets of primary keys, from dataset 660 into buckets 662 and 664, on the basis of a driving column in an illustrative embodiment. Additionally, in such an embodiment as illustrated in connection with FIG. 6, the continuous set of primary keys associated with the particular last modified date (i.e., driving column) is added in the record. As new transactions come for one or more new dates, new records will be added, and each record will have minimum and maximum primary key values of a continuous set of primary keys (as further detailed in connection with FIG. 7).

Figure 7:
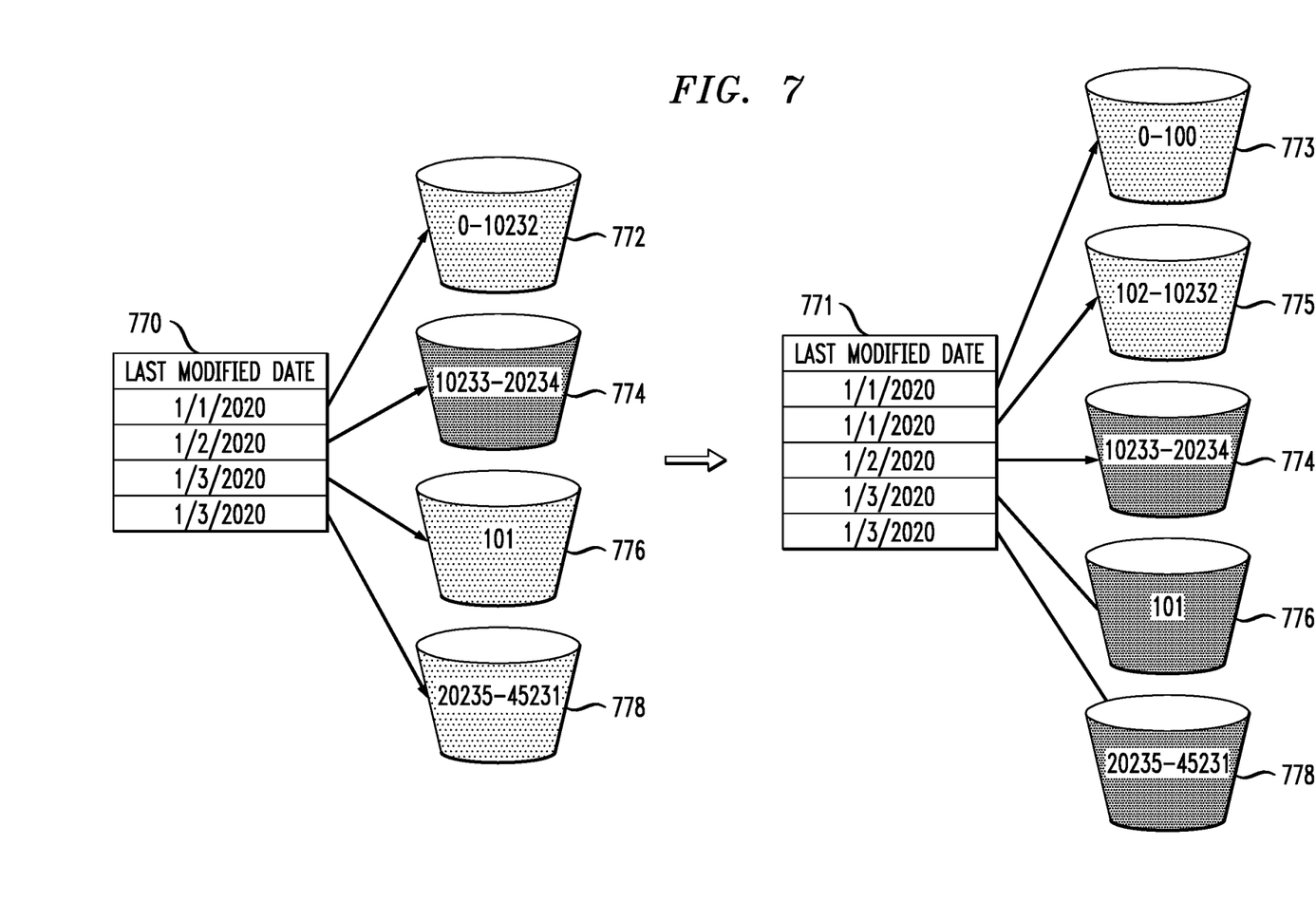
FIG. 7 shows splitting a single table of records into multiple buckets of multiple subsets of records in an illustrative embodiment.

FIG. 7 shows splitting a single table of records into multiple buckets of multiple subsets of records in an illustrative embodiment. In one or more embodiments, records in a table can be modified according to the continuous set of primary keys associated with a driving column. In the FIG. 7 example, the continuous dataset of primary keys is updated and/or newly added for the date Jan. 3, 2020 as follows: Bucket 776 is updated with primary key 101; and Bucket 778 is newly added with primary keys 20235-45231. Accordingly, continuing with the FIG. 7 example, primary key 101 associated with date Jan. 1, 2020 was modified, and therefore, the corresponding lookup table 770 is modified to create modified lookup table 771 by splitting a single record linking to one bucket (i.e., bucket 772) for date Jan. 1, 2020 into two records linking two buckets (i.e., bucket 773 and bucket 775), as shown in FIG. 7 as follows: Bucket 773 for keys 0-100; and Bucket 775 for keys 102-10232. By way of completeness, FIG. 7 also depicts bucket 774, which contains keys 10233-20234.

Additionally, according to the above-noted purging criteria in this example (i.e., LAST_MODIFIED_DATE<SYSDATE-365), one or more embodiments include needing to purge all of the primary keys which are not modified over the previous 365 days. Therefore, as soon as at least one new transaction is processed for Jan. 1, 2021, the table is eligible for purging, and the records associated with Jan. 1, 2020 need to be purged. Using the primary keys associated with the date Jan. 1, 2020, data offloading can be carried out, for example, as shown in FIG. 8.

Figure 8:
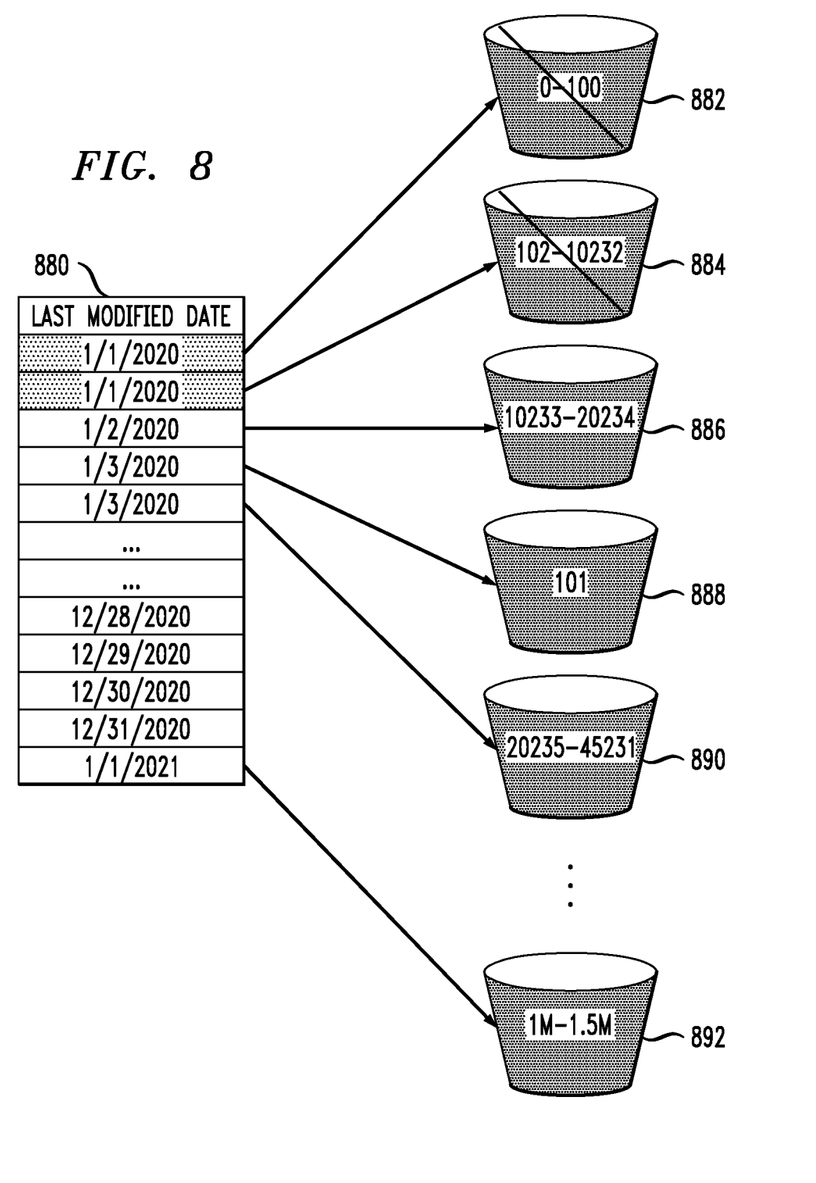
FIG. 8 shows data offloading when at least a portion of a table is eligible for purging in an illustrative embodiment.

FIG. 8 shows data offloading when at least a portion of a table is eligible for purging in an illustrative embodiment. Specifically, in the FIG. 8 example, as noted in table 880, the primary keys associated with the date Jan. 1, 2020 (i.e., keys 0-100 and 102-10232) are identified and/or determined as being eligible for purging. Accordingly, the buckets associated with those primary keys (i.e., bucket 882 and bucket 884) can be targeted for data offloading (i.e., purged from the database). By way of completeness, FIG. 8 also depicts buckets 886, 888, 890, and 892, which are associated with other primary keys than those highlighted for purging.

Figure 9:
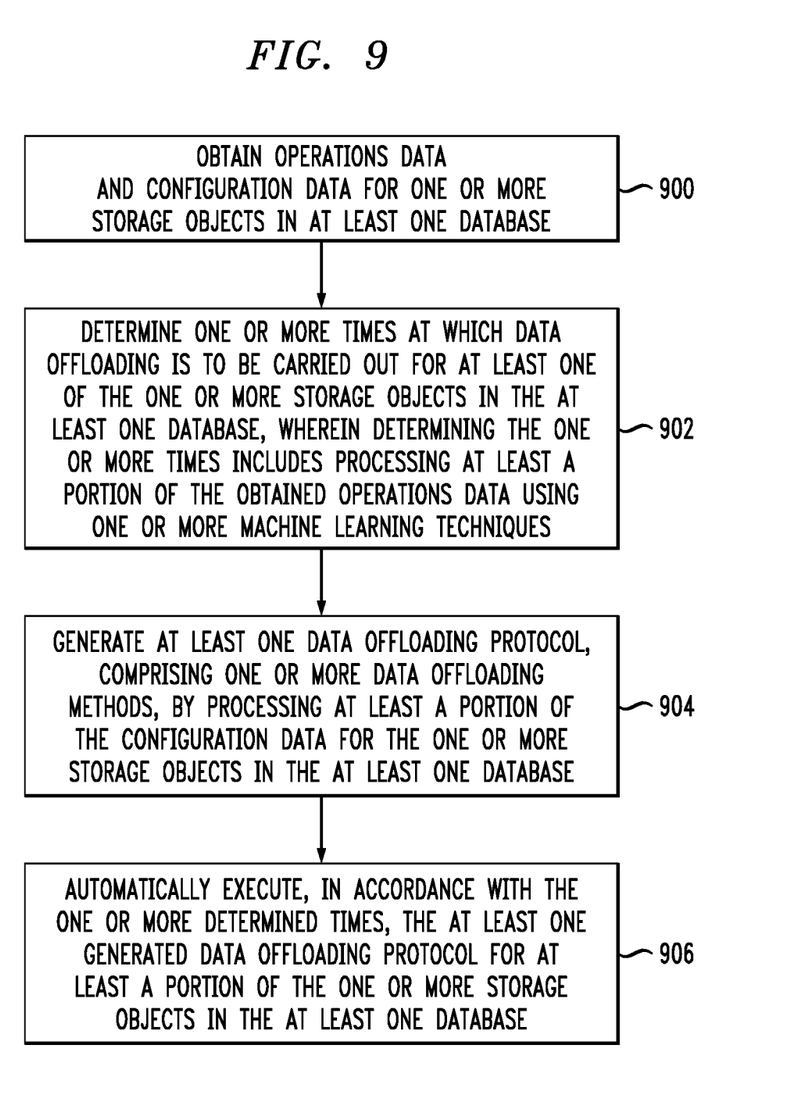
FIG. 9 is a flow diagram of a process for automatically detecting data offloading methods using data bucketing and machine learning techniques in an illustrative embodiment.

FIG. 9 is a flow diagram of a process for automatically detecting data offloading methods using data bucketing and machine learning techniques in an illustrative embodiment. It is to be understood that this particular process is only an example, and additional or alternative processes can be carried out in other embodiments.

In this embodiment, the process includes steps 900 through 906. These steps are assumed to be performed by the automated data offloading system 105 utilizing elements 112, 114, 116 and 118.

Step 900 includes obtaining operations data and configuration data for one or more storage objects in at least one database. Step 902 includes determining one or more times at which data offloading is to be carried out for at least one of the one or more storage objects in the at least one database, wherein determining the one or more times includes processing at least a portion of the obtained operations data using one or more machine learning techniques. In at least one embodiment, processing at least a portion of the obtained operations data includes processing the at least a portion of the obtained operations data using at least one autoregressive integrated moving average model.

Additionally or alternatively, processing at least a portion of the obtained operations data can include determining at least one behavioral pattern of DML operations. In such an embodiment, determining one or more times at which data offloading is to be carried out includes determining, based at least in part on the at least one determined behavioral pattern of DML operations, one or more times at which DML operations are at a minimum level.

Step 904 includes generating at least one data offloading protocol, comprising one or more data offloading methods, by processing at least a portion of the configuration data for the one or more storage objects in the at least one database. In at least one embodiment, generating at least one data offloading protocol includes determining a cost associated with the at least one data offloading protocol. Such an embodiment can also include processing the at least a portion of the configuration data using data bucketing techniques upon a determination that the cost associated with the at least one data offloading protocol exceeds a given amount. Additionally or alternatively, generating at least one data offloading protocol can include building a respective data offloading script for each of the one or more objects in the at least one database, wherein each data offloading script comprises at least a portion of one or more data offloading methods.

Step 906 includes automatically executing, in accordance with the one or more determined times, the at least one generated data offloading protocol for at least a portion of the one or more storage objects in the at least one database. The techniques depicted in FIG. 9 can also include training the one or more machine learning techniques based at least in part on results from automatically executing the at least one generated data offloading protocol.

Accordingly, the particular processing operations and other functionality described in conjunction with the flow diagram of FIG. 9 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically detect data offloading methods using data bucketing and machine learning techniques. These and other embodiments can effectively overcome problems associated with resource-intensive, time-intensive, and error-prone techniques.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. Although described in the context of system 100, these platforms may also be used to implement at least portions of other information processing systems in other embodiments.

Figure 10:
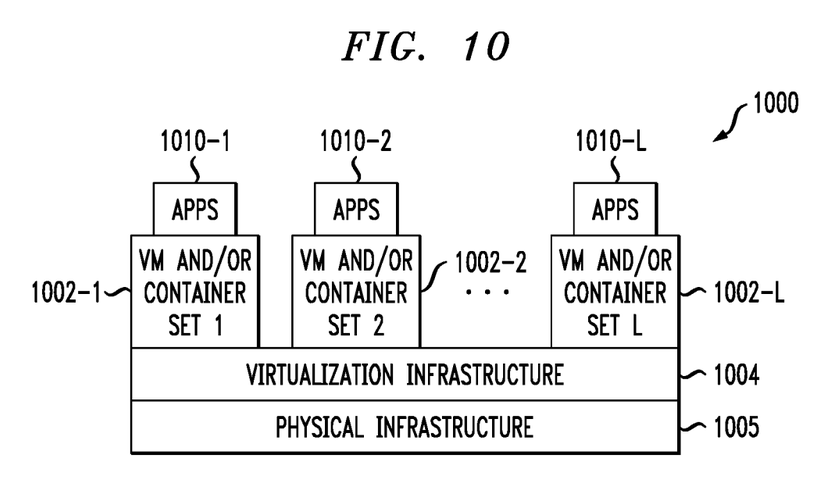
FIGS. 10 and 11 show examples of processing platforms that may be utilized to implement at least a portion of an information processing system in illustrative embodiments.
Figure 11:
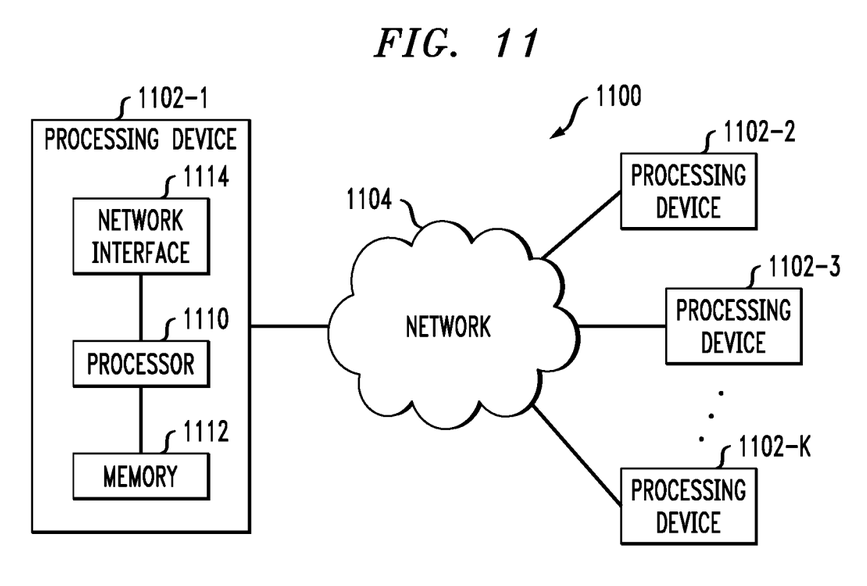

FIG. 10 shows an example processing platform comprising cloud infrastructure 1000. The cloud infrastructure 1000 comprises a combination of physical and virtual processing resources that are utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 comprise respective VMs, respective sets of one or more containers, or respective sets of one or more containers running in VMs. In some implementations of the FIG. 10 embodiment, the VMs/container sets 1002 comprise respective VMs implemented using virtualization infrastructure 1004 that comprises at least one hypervisor.

A hypervisor platform may be used to implement a hypervisor within the virtualization infrastructure 1004, wherein the hypervisor platform has an associated virtual infrastructure management system. The underlying physical machines comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1102-1 in the processing platform 1100 comprises a processor 1110 coupled to a memory 1112.

The processor 1110 comprises a microprocessor, a microcontroller, an application-specific integrated circuit (ASIC), a field-programmable gate array (FPGA) or other type of processing circuitry, as well as portions or combinations of such circuitry elements.

The memory 1112 comprises random access memory (RAM), read-only memory (ROM) or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   obtaining operations data and configuration data for one or more storage objects in at least one database;
   determining one or more times at which data offloading is to be carried out for at least one of the one or more storage objects in the at least one database, wherein determining the one or more times comprises processing at least a portion of the obtained operations data using one or more machine learning techniques, wherein processing at least a portion of the obtained operations data comprises:
      predicting a number of data manipulation language operations occurring for one or more temporal intervals by processing the at least a portion of the obtained operations data using at least one autoregressive model; and
      determining, based at least in part on the predicted number of data manipulation language operations, at least a portion of the one or more times, during the one or more temporal intervals, at which the predicted number of data manipulation language operations is below a threshold;
   generating at least one data offloading protocol, comprising one or more data offloading methods, by processing at least a portion of the configuration data for the one or more storage objects in the at least one database; and
   automatically executing, in accordance with the one or more determined times, the at least one generated data offloading protocol for at least a portion of the one or more storage objects in the at least one database;
   wherein the method is performed by at least one processing device comprising a processor coupled to a memory.

2. The computer-implemented method of claim 1, wherein generating at least one data offloading protocol comprises determining a cost associated with the at least one data offloading protocol.

3. The computer-implemented method of claim 2, further comprising:
   processing the at least a portion of the configuration data using data bucketing techniques upon a determination that the cost associated with the at least one data offloading protocol exceeds a given amount.

4. The computer-implemented method of claim 1, wherein generating at least one data offloading protocol comprises building a respective data offloading script for each of the one or more objects in the at least one database, wherein each data offloading script comprises at least a portion of one or more data offloading methods.

5. The computer-implemented method of claim 1, further comprising:
   training the one or more machine learning techniques based at least in part on results from automatically executing the at least one generated data offloading protocol.

6. A non-transitory processor-readable storage medium having stored therein program code of one or more software programs, wherein the program code when executed by at least one processing device causes the at least one processing device:
   to obtain operations data and configuration data for one or more storage objects in at least one database;
   to determine one or more times at which data offloading is to be carried out for at least one of the one or more storage objects in the at least one database, wherein determining the one or more times comprises processing at least a portion of the obtained operations data using one or more machine learning techniques, wherein processing at least a portion of the obtained operations data comprises:
      predicting a number of data manipulation language operations occurring for one or more temporal intervals by processing the at least a portion of the obtained operations data using at least one autoregressive model; and
      determining, based at least in part on the predicted number of data manipulation language operations, at least a portion of the one or more times, during the one or more temporal intervals, at which the predicted number of data manipulation language operations is below a threshold;
   to generate at least one data offloading protocol, comprising one or more data offloading methods, by processing at least a portion of the configuration data for the one or more storage objects in the at least one database; and
   to automatically execute, in accordance with the one or more determined times, the at least one generated data offloading protocol for at least a portion of the one or more storage objects in the at least one database.

7. The non-transitory processor-readable storage medium of claim 6, wherein generating at least one data offloading protocol comprises determining a cost associated with the at least one data offloading protocol, and processing the at least a portion of the configuration data using data bucketing techniques upon a determination that the cost associated with the at least one data offloading protocol exceeds a given amount.

8. The non-transitory processor-readable storage medium of claim 6, wherein generating at least one data offloading protocol comprises building a respective data offloading script for each of the one or more objects in the at least one database, wherein each data offloading script comprises at least a portion of one or more data offloading methods.

9. The non-transitory processor-readable storage medium of claim 6, wherein the program code when executed by the at least one processing device further causes the at least one processing device:
to train the one or more machine learning techniques based at least in part on results from automatically executing the at least one generated data offloading protocol.

10. An apparatus comprising:
at least one processing device comprising a processor coupled to a memory;
the at least one processing device being configured:
to obtain operations data and configuration data for one or more storage objects in at least one database;
to determine one or more times at which data offloading is to be carried out for at least one of the one or more storage objects in the at least one database, wherein determining the one or more times comprises processing at least a portion of the obtained operations data using one or more machine learning techniques, wherein processing at least a portion of the obtained operations data comprises:
predicting a number of data manipulation language operations occurring for one or more temporal intervals by processing the at least a portion of the obtained operations data using at least one autoregressive model; and
determining, based at least in part on the predicted number of data manipulation language operations, at least a portion of the one or more times, during the one or more temporal intervals, at which the predicted number of data manipulation language operations is below a threshold;
to generate at least one data offloading protocol, comprising one or more data offloading methods, by processing at least a portion of the configuration data for the one or more storage objects in the at least one database; and
to automatically execute, in accordance with the one or more determined times, the at least one generated data offloading protocol for at least a portion of the one or more storage objects in the at least one database.

11. The apparatus of claim 10, wherein generating at least one data offloading protocol comprises determining a cost associated with the at least one data offloading protocol, and processing the at least a portion of the configuration data using data bucketing techniques upon a determination that the cost associated with the at least one data offloading protocol exceeds a given amount.

12. The apparatus of claim 10, wherein generating at least one data offloading protocol comprises building a respective data offloading script for each of the one or more objects in the at least one database, wherein each data offloading script comprises at least a portion of one or more data offloading methods.

13. The apparatus of claim 10, wherein the at least one processing device is further configured:
to train the one or more machine learning techniques based at least in part on results from automatically executing the at least one generated data offloading protocol.

14. The apparatus of claim 10, wherein the at least one autoregressive model comprises at least one autoregressive integrated moving average (ARIMA) model, and wherein determining one or more times at which data offloading is to be carried out for at least one of the one or more storage objects in the at least one database comprises determining multiple times at which data offloading is to be carried out for the at least one of the one or more storage objects in the at least one database by processing the at least a portion of the obtained operations data using the at least one ARIMA model in connection with multiple temporal granularities.

15. The computer-implemented method of claim 1, wherein the at least one autoregressive model comprises at least one ARIMA model, and wherein determining one or more times at which data offloading is to be carried out for at least one of the one or more storage objects in the at least one database comprises determining multiple times at which data offloading is to be carried out for the at least one of the one or more storage objects in the at least one database by processing the at least a portion of the obtained operations data using the at least one ARIMA model in connection with multiple temporal granularities.

16. The non-transitory processor-readable storage medium of claim 6, wherein the at least one autoregressive model comprises at least one ARIMA model, and wherein determining one or more times at which data offloading is to be carried out for at least one of the one or more storage objects in the at least one database comprises determining multiple times at which data offloading is to be carried out for the at least one of the one or more storage objects in the at least one database by processing the at least a portion of the obtained operations data using the at least one ARIMA model in connection with multiple temporal granularities.

17. The computer-implemented method of claim 1, wherein determining at least a portion of the one or more times, during the one or more temporal intervals, at which the predicted number of data manipulation language operations is below a threshold comprises determining a time, during the one or more temporal intervals, at which the predicted number of data manipulation language operations is at a minimum level.

18. The computer-implemented method of claim 1, wherein predicting a number of data manipulation language operations occurring for one or more temporal intervals comprises predicting a number of data manipulation language operations occurring for one or more temporal intervals across each of multiple temporal granularities.

19. The non-transitory processor-readable storage medium of claim 6, wherein determining at least a portion of the one or more times, during the one or more temporal intervals, at which the predicted number of data manipulation language operations is below a threshold comprises determining a time, during the one or more temporal intervals, at which the predicted number of data manipulation language operations is at a minimum level.

20. The apparatus of claim 10, wherein determining at least a portion of the one or more times, during the one or more temporal intervals, at which the predicted number of data manipulation language operations is below a threshold comprises determining a time, during the one or more temporal intervals, at which the predicted number of data manipulation language operations is at a minimum level.

* * * * *